US012190183B1

(12) United States Patent
Verma (10) Patent No.: US 12,190,183 B1
(45) Date of Patent: Jan. 7, 2025

(54) INTELLIGENT SYSTEM TO CATEGORIZE QUICK RESPONSE ("QR") CODE BASED TRANSFERS USING SHARED RECOMMENDATIONS AND GENERATIVE AI

(71) Applicant: Bank of America Corporation, Charlotte, NC (US)

(72) Inventor: Sandeep Verma, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/401,635

(22) Filed: Jan. 1, 2024

(51) Int. Cl.
*G06K 19/06* (2006.01)

(52) U.S. Cl.
CPC .............. *G06K 19/06037* (2013.01)

(58) Field of Classification Search
None
See application file for complete search history.

(56) References Cited

U.S. PATENT DOCUMENTS

11,107,061 B2   8/2021   Bhuma et al.

*Primary Examiner* — Kristy A Haupt
(74) *Attorney, Agent, or Firm* — Weiss & Arons LLP (57) ABSTRACT

Systems and methods are provided for categorizing a transfer target destination associated with a quick response ("QR") code. An artificial intelligence ("AI") engine may receive a plurality of recommendations for categorizing the transfer target destination. Each recommendation may be passed through a natural language processing ("NLP") algorithm. Each recommendation may then be parsed by the AI engine to extract tag words. Each tag word may be mapped to a respective category. Each instance of each tag word and associated category may be stored in a database. The number of instances of each tag word and associated category may be counted. A percentage may be calculated for each category based on the number of instances associated with each category and the total number of instances of all the tag words.

20 Claims, 5 Drawing Sheets

INTELLIGENT SYSTEM TO CATEGORIZE QUICK RESPONSE ("QR") CODE BASED TRANSFERS USING SHARED RECOMMENDATIONS AND GENERATIVE AI

FIELD OF TECHNOLOGY

Aspects of the disclosure relate to technology for categorizing QR code based transfers.

BACKGROUND OF THE DISCLOSURE

Customers having accounts at financial institutions may desire to analyze their expenditures. Expense analysis dashboards may be used by customers to review their monthly expenditures. The expense analysis dashboards may show an allocation of the customer's monthly expenses into categories. The expense analysis dashboards may show a percentage of the monthly expense allocated for each category. Expense analysis dashboards may be generated by a customer's financial institution.

Currently vendors using online or point of sale machine transactions may be categorized by the financial institutions. This may allow the customer's financial institution to know how to categorize each transaction conducted by the customer. The financial institution may then generate an expense analysis dashboard based on the known categorization.

Currently vendors may generate and display a QR code for a customer to scan to complete a transaction. Scanning the QR code will initiate a payment from the customer's account at the customer's financial institution to the vendor's account at the vendor's financial institution. However, the categorization of the new QR code may be unknown since the customer's financial institution was not involved in its generation. The customer's financial institution may not be able to generate a complete expense analysis dashboard without this information.

Therefore, it would be desirable to generate a new method of determining a category associated with a vendor's QR code. It would be further desirable to generate expense analysis dashboards incorporating the transactions conducted using QR codes that have previously been uncategorized.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Systems and methods are provided for categorizing QR code based transfers. Systems and methods are provided for generating expense analysis dashboards incorporating transactions conducted using QR codes that have previously been uncategorized.

Financial institutions may provide customers with the ability to view their expenditures in expense analysis dashboards. The expense analysis dashboards may show an allocation of the customer's expenses into categories. The expenses utilized in the expense analysis dashboards may be expenses occurring within a particular week, bi-week, month, year or any suitable period of time. The expense analysis dashboards may show an expense breakdown into categories. The expense analysis dashboard may be in the form of a pie chart. The expense analysis dashboard may be in the form of a percentage distribution.

Financial institutions may be involved in setting up interactions with a vendor's online transactions and/or POS card transactions. Financial institutions may therefore know how to categorize the vendor. For example, travel, food, restaurant, groceries, entertainment, utility bills, cell phone etc.

Vendors may generate their own QR codes. The QR codes may be linked to an account they hold with a financial institution. The vendors may display one QR code to be used for each transaction. The vendors may generate new QR codes for each transaction. The customer may generate a QR code which is scanned by the vendor.

The generated QR codes may be scanned by a mobile device. The mobile device may include smartphones, smartwatches, smart glasses, other smart devices or any other suitable device for scanning a QR code and conducting a transaction. The mobile device may include a QR code based transfer application. The QR code based transfer application may allow the mobile device to scan a vendor's QR code and initiate a transaction based on the scanned information. The QR code based transfer application may generate a QR code for the vendor to scan to initiate the transaction.

The QR code based transfer application may be linked to a user's customer account at the user's financial institution. The QR code based transfer application may be able to scan a QR code and initiate a transaction from the customer account. The scanned QR code may contain information. The information may be related to a transfer target destination. The information may be related to the amount of the transaction. The information may be related to other transaction related information such as a time and location of the transaction. The QR code based transfer application may use the information to transfer funds from the customer account to the transfer target destination. The transfer target destination may be the vendor's account at the vendor's financial institution.

The QR code based transfer application may verify the user account before conducting a transaction. The user account may be verified through confirmation by the user's mobile device. The user account may be verified through the user logging into the QR code based transfer application. The login may prompt the user to enter credentials. The credentials may be a username and password. The credentials may be a biometric identifier. The credentials may be embedded in the mobile device.

A QR code may be assigned a categorization (see below). A QR code may be used by vendors having multiple categorizations. For example, a grocery store may sell groceries as well as items that fall into other categories. The QR code may be linked to a transfer target destination. Categorizing the QR code may effectively categorize the transfer target destination. The transfer target destination may be assigned a category. The transfer target destination may be assigned multiple categories. The transfer target destination may be assigned a ranking of how often they are categorized in certain categories on a percentage basis. The transfer target destination may be associated with multiple QR codes.

For the purposes of generating an expense analysis dashboard it may be useful to assign one category to the transfer target destination. For the purposes of generating business data it may be useful to assign one category to the transfer target destination. The one category may be the category with the highest ranking. The one category may be assigned by the systems and methods outlined below. The one category may be chosen by the customer upon conducting the transaction. The financial institution may confirm the one category with the vendor.

The systems and methods may include using a generative artificial intelligence ("AI") engine for categorizing a transfer target destination associated with a quick response ("QR") code using a plurality of recommendations. The plurality of recommendations may come from a plurality of customers who conducted a transaction using the QR code. The transactions may be conducted by the plurality of customers using a QR code based transfer application on a smart device. The QR code based transfer application may prompt a user to enter an input during the transaction. The input may be a comment on what was purchased. The input may be a recommendation for how to categorize the vendor. Responding to the prompt may be optional. Responding to the prompt may be required.

A generative AI engine may receive all the recommendations. The AI engine may include a natural language processing ("NLP") algorithm. The AI engine may be part of a computer. The AI engine may be program run by the computer. The recommendations may pass through the NLP algorithm. The NLP algorithm may process the recommendations to place them into a common language. The NLP algorithm may process the recommendations to correct for spelling errors. The recommendations may pass through the NLP upon receiving a threshold number of recommendations. The threshold number of recommendations may be 50, 100, 200, 1000, 2000 or any suitable number of recommendations.

The NLP algorithm may be included separate from the AI engine. The NLP algorithm may be included in a separate computer from the AI engine. The NLP algorithm may be included in the cloud. The AI engine may pass the recommendations through the NLP algorithm. The NLP algorithm may pass the recommendations, after being processed, back to the AI engine.

The systems and methods may include parsing each recommendation passed through the NLP algorithm to extract tag words. The AI engine may extract tag words by filtering out meaningful words from each recommendation. Meaningful words may include words that help in identifying a category. For example, food, vegetables and fruit may help in identifying the category as Groceries.

The AI engine may map the extracted tag words to categories. Some tag words may fall into multiple categories. The mapping may be predetermined for each tag word. The mapping may include data based on other extracted tag words from the recommendation. The mapping may include data based on words filtered out from the recommendation.

The systems and methods may include assigning a single category to the transfer target destination. The systems and methods may include associating each recommendation with a category. The recommendation may be associated with the category to which a majority of the tag words parsed in the recommendation were mapped. Should two or more categories, that have an equal number of mapped tag words, include the most number of mapped tag words, the recommendation may be associated with both categories.

The systems and methods may include storing the recommendation and associated category in a database located within the AI engine. The systems and methods may include counting the number of recommendations associated with each category. The systems and methods may include assigning to the transfer target destination the category with the largest number of associated recommendations.

The systems and methods may include assigning multiple categories to the transfer target destination.

The systems and methods after the mapping may include associating each tag word with a category. The systems and methods may include storing each instance of each tag word and associated category. Each instance of each tag word and associated category may be stored in a database. The database may be located within the AI engine. The database may be located separate from the AI engine. The database may be located in the cloud.

The systems and methods may include counting the number of instances of each tag word associated with each category. Each category may be assigned a percentage. The percentage may be a percentage of how many instances of the tag words associated with a respective category appear out of the total number of instances of tag words. For example, if there are 158 tag words associated with a Food category, and there are 526 instances of tag words stored in the database, the Food category would be assigned 30%.

The transfer target destination associated with the QR code may be assigned all the categories and associated percentages. The transfer target destination associated with the QR code may be assigned the categories with percentages larger than a threshold amount. The threshold amount may be 10%, 15%, 20%, 30%, 50% or any suitable percentage.

The systems and methods may include only assigning categories to the transfer target destination after the AI engine receives a threshold number of recommendations. The systems and methods may include repeating the categorizing steps. The repeating the categorizing steps may be upon receiving a new recommendation. The repeating the categorizing steps may be upon receiving a threshold number of new recommendations. The repeating the categorizing steps may be upon an elapse of a predetermined time period.

The systems and methods may, after categorizing the transfer target destination include a prompt in the QR code based transfer application for subsequent transaction to either make a recommendation, select the category with the largest percentage number of associated recommendations or select the category with the second largest percentage number of associated recommendations. Entering a new recommendation may send the new recommendation to the AI engine. Selecting a category may increase the number of recommendations associated with the selected category to the database. Selecting a category may increase the number of instances associated with the selected category to the database.

The AI engine may in real time continuously update the categorization of the transfer target destination. Based on the updated categorization, the prompts in the QR code based transfer application may change. In subsequent transactions the prompts may be updated based on the current categorization.

The systems and methods may include generating an expense breakdown using the categorized transfer target destination. The expense breakdown may include each transaction associated with the user account during the specified time period. Each transaction may include an amount and a category assigned to the destination and associated with the transaction. The systems and methods may count the total amount associated with each category. The total amounts may be used to generate the expense breakdown by category.

The category of a previously uncategorized transfer target destination may be determined by the systems and methods outlined above. For the purposes of the expense breakdown the category of a previously uncategorized transfer target destination may be determined by the user's recommendation. A user that did not input a recommendation may be asked to make a recommendation at the time the expense breakdown is generated. The user recommendation may be used in the expense breakdown.

Categorizing the previously uncategorized transfer target destination may not be completed when a user requests an expense breakdown. The transaction with the previously uncategorized transfer target destination may be left out when generating the expense breakdown. The expense breakdown may be updated when categorization is completed.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
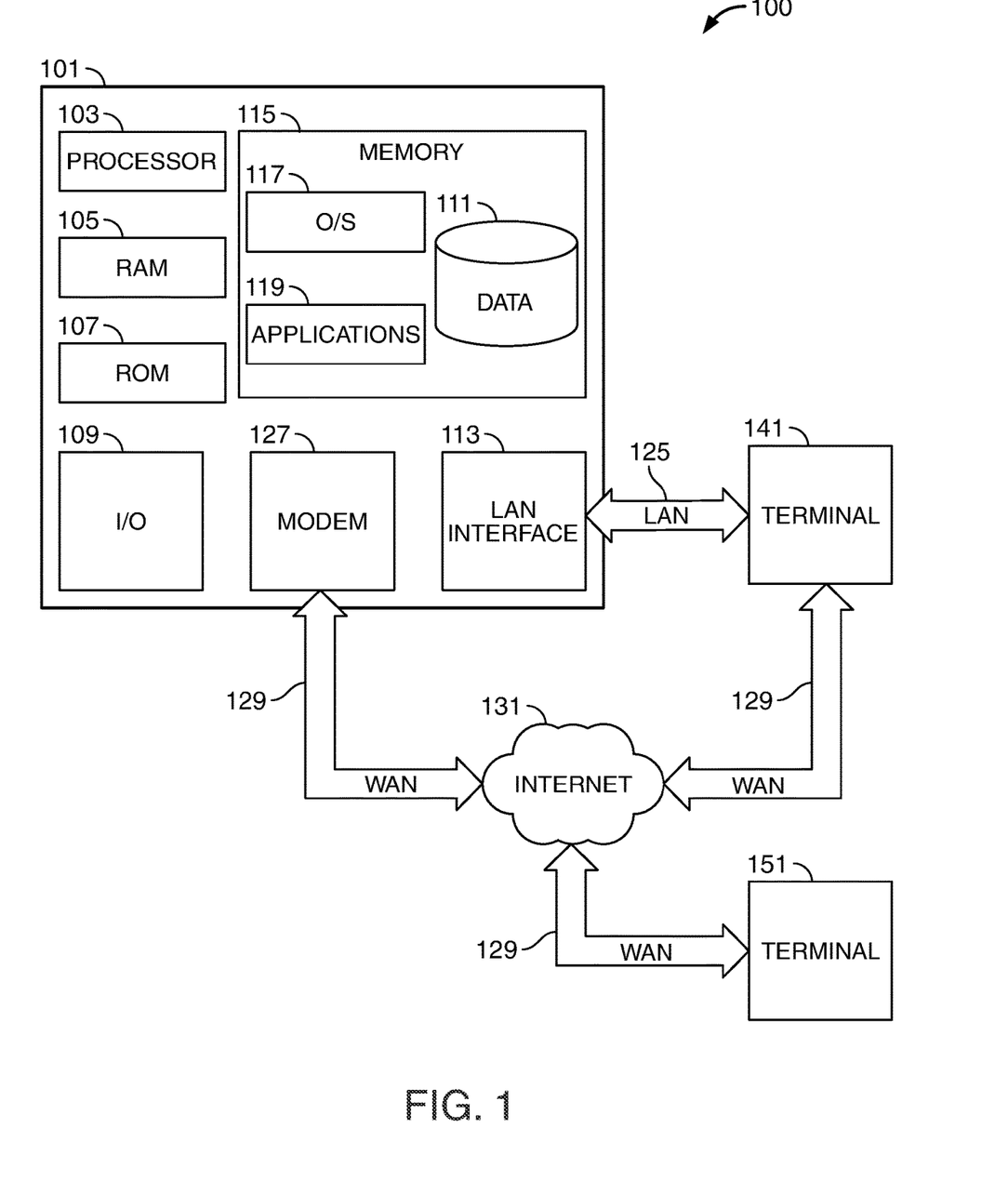
FIG. 1 shows an illustrative apparatus in accordance with principles of the disclosure.

In accordance with principles of the disclosure, FIG. 1 shows an illustrative block diagram of apparatus 100 that includes a computer 101. Computer 101 may alternatively be referred to herein as a "computer system" or "computing device." Elements of apparatus 100, including computer 101, may be used to implement various aspects of the systems and method disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101, e.g., the operating system 117 and applications 119 such as an automatic data layering program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an automatic data layering program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an automatic data layering program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refers to applications located on a server remote from a user, wherein some or all the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an automatic data layering program and security protocols, as well as other programs. In an embodiment, one or more programs, or aspects of a program, may use one or more AI/ML algorithm(s). The various tasks may be related to analyzing and categorizing various data to layer the data according to levels of access.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
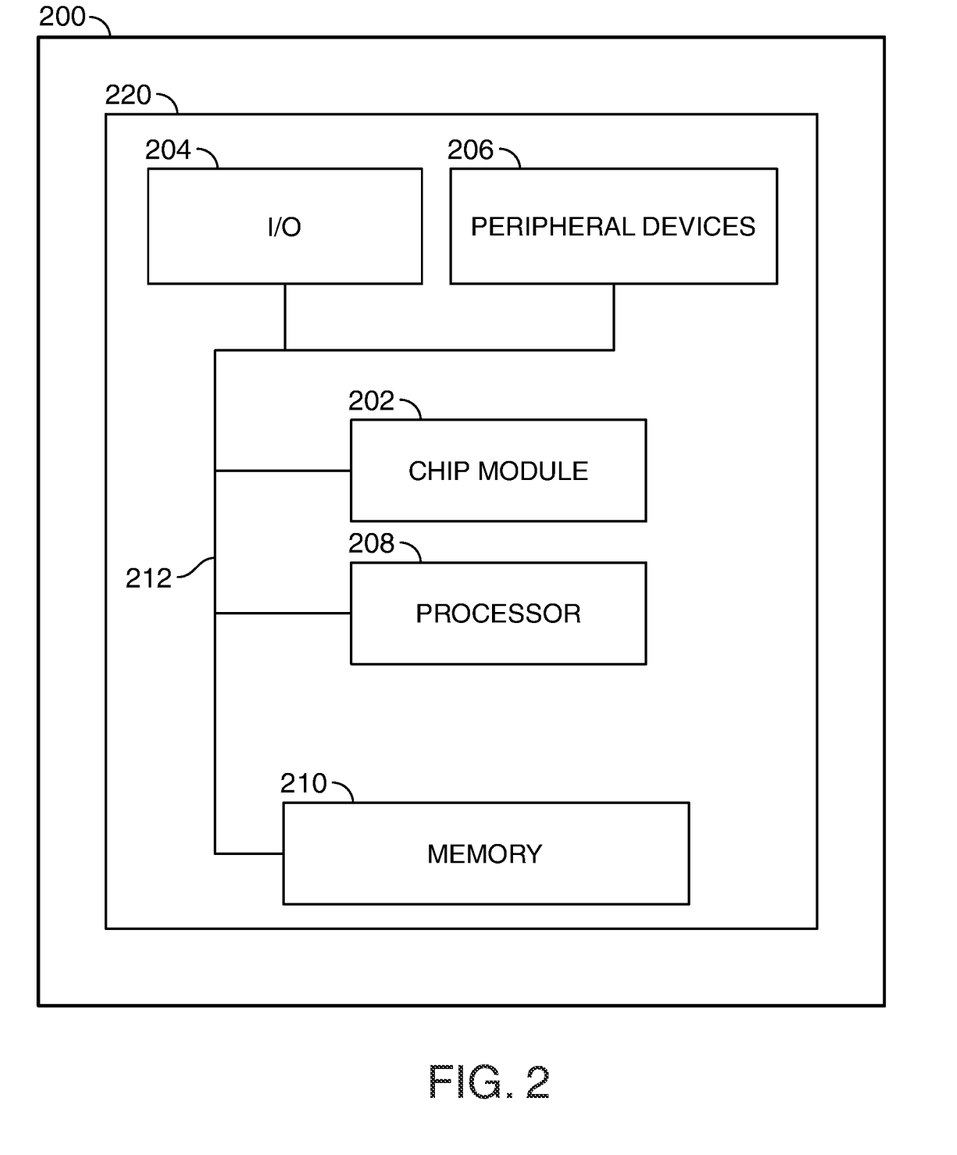
FIG. 2 shows another illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
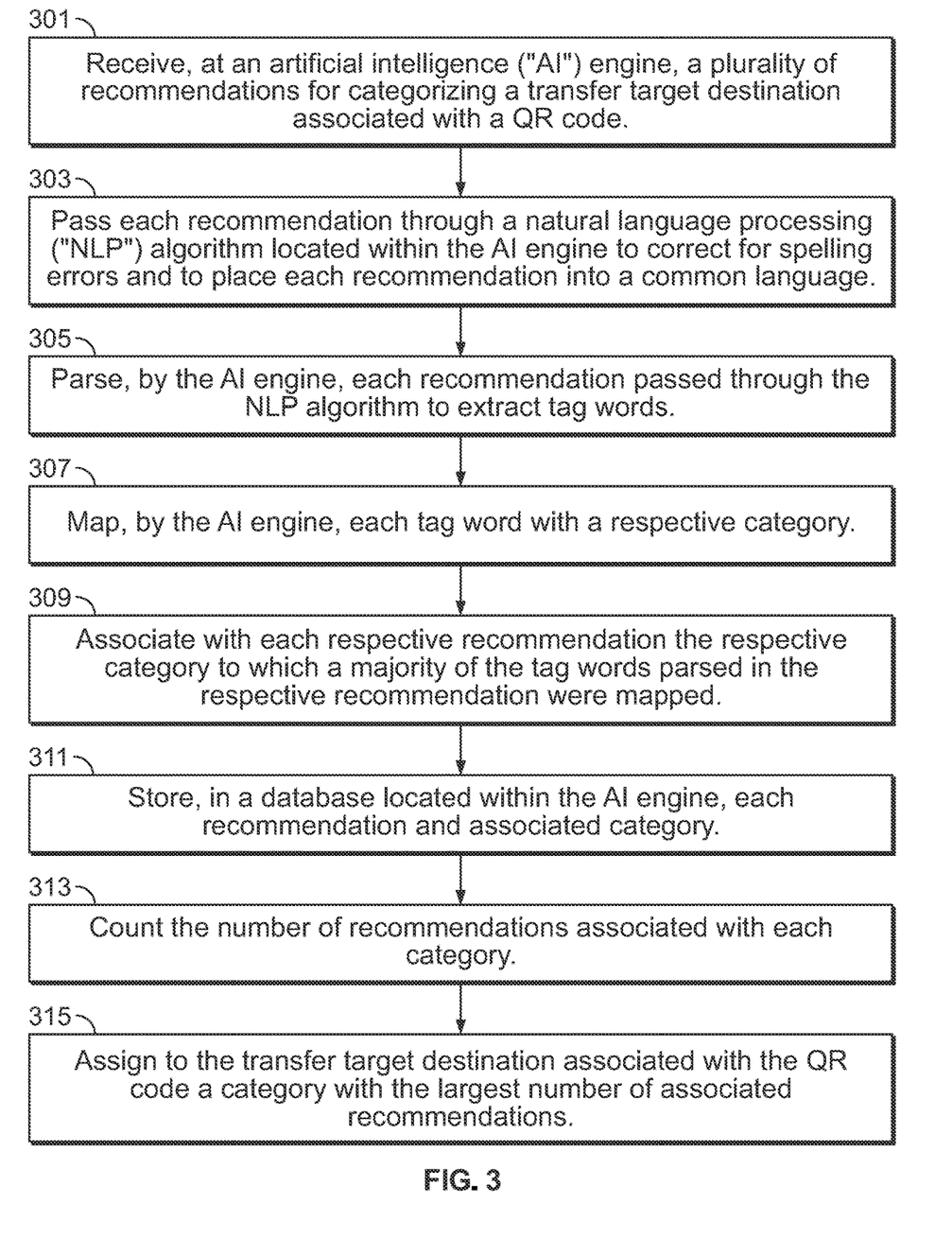
FIG. 3 shows an illustrative flowchart in accordance with principles of the disclosure.

FIG. 3 shows an illustrative flowchart in accordance with principles of the disclosure. At step 301, methods may include receiving, at an AI engine, a plurality of recommendations for categorizing a transfer target destination associated with a QR code. At step 303, methods may include passing each recommendation through an NLP algorithm located within the AI engine to correct for spelling errors and to place each recommendation into a common language. At step 305, methods may include parsing, by the AI engine, each recommendation passed through the NLP algorithm to extract tag words. At step 307, methods may include mapping, by the AI engine, each tag word with a respective category. At step 309 methods may include associating with each respective recommendation the respective category to which a majority of the tag words parsed in the respective recommendation were mapped. At step 311 methods may include storing, in a database located within the AI engine, each recommendation and associated category. At step 313 methods may include counting the number of recommendations associated with each category. At step 315 methods may include assigning to the transfer target destination associated with the QR code a category with the largest number of associated recommendations.

Figure 4:
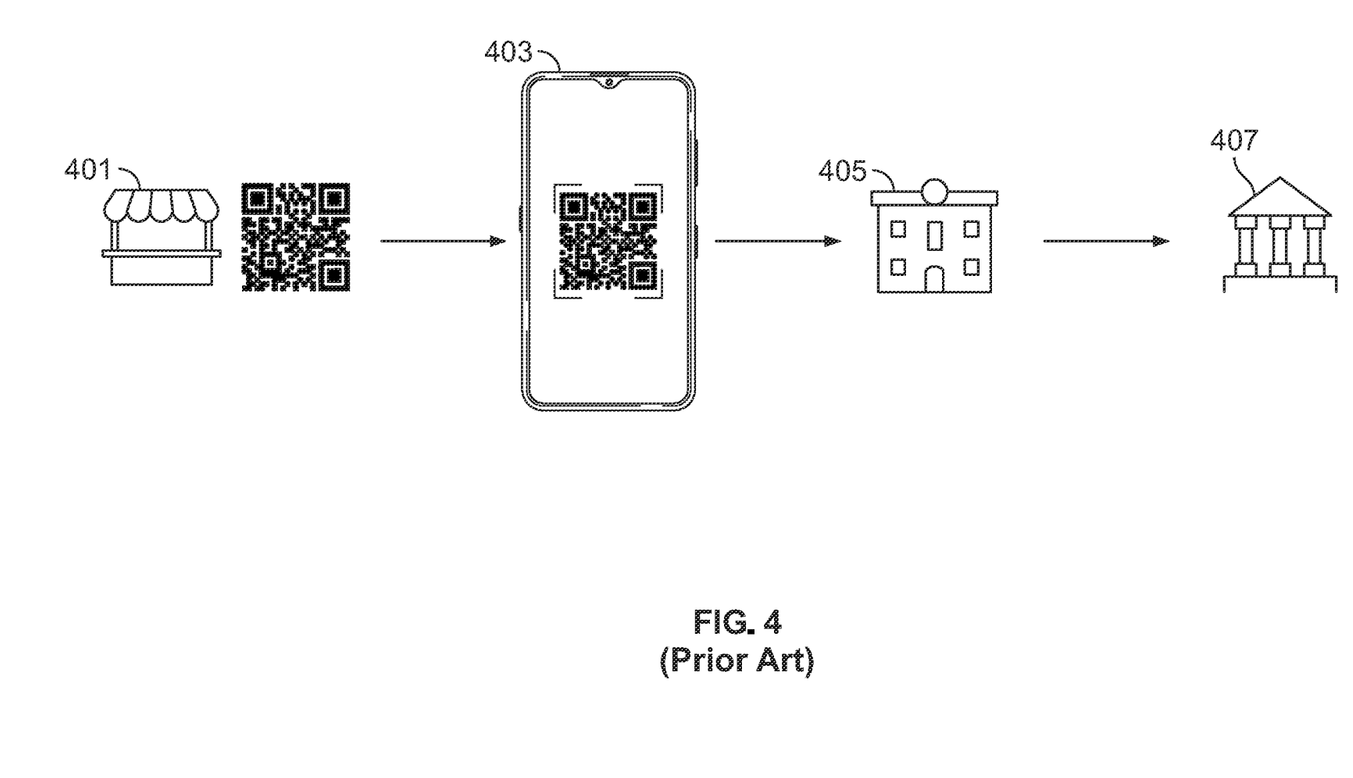
FIG. 4 shows a prior art diagram.

FIG. 4 shows a prior art diagram. Vendor 401 may present a QR code to a user during a transaction. The user may scan the QR code with mobile device 403. The mobile device may send the transaction to user's financial institution 405. The user's financial institution may transfer funds to vendor's financial institution 407.

Figure 5:
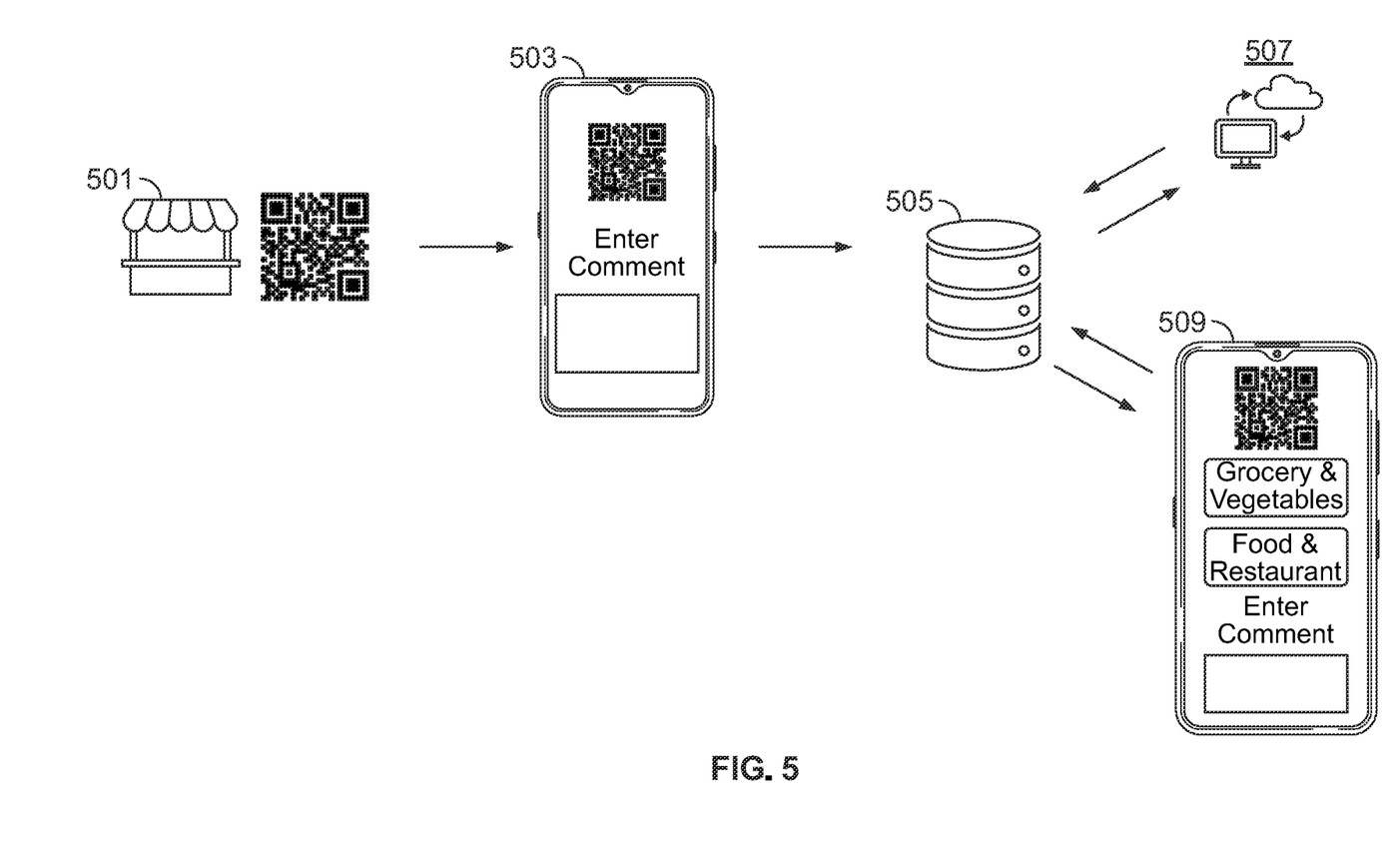
FIG. 5 shows an illustrative diagram in accordance with principles of the disclosure.

FIG. 5 shows an illustrative diagram in accordance with principles of the disclosure. Vendor 501 may present a QR code to a user during a transaction. The user may scan the QR code with mobile device 503 using a QR code based transfer application. The QR code based transfer application may prompt the user to input a recommendation. The user may not be required to input a recommendation to conduct the transaction. The QR code based transfer application may send the recommendation to AI engine 505. AI engine 505 may pass the recommendations to NLP algorithm 507. NLP algorithm 507 may be included in AI engine 505. NLP algorithm 507 may be separate from AI engine 505. NLP algorithm 507 may be in communication with the internet. After passing through NLP algorithm 507, the recommendations may be passed back to AI engine 505.

AI engine 505 may categorize the transfer target destination using the systems and methods described above. AI engine 505 may pass the categorization to the QR code based transfer application. Upon subsequent transactions with the QR code, mobile device 509 may be programmed to prompt the user to select two additional options. The two additional options may include the two most relevant categories assigned to the transfer target destination associated with the QR code. Mobile device 509 may pass the selection back to the AI engine. In this way the AI engine may constantly and accurately update the categorization based on user input. The two additional options may be updated as the AI engine generates more accurate categorizations.

Thus, systems and methods for INTELLIGENT SYSTEM TO CATEGORIZE QR CODE BASED TRANSFERS USING SHARED RECOMMENDATIONS AND GENERATIVE AI have been provided. Persons skilled in the art will appreciate that the present invention can be practiced by other than the described embodiments, which are presented for purposes of illustration rather than of limitation, and that the present invention is limited only by the claims that follow.

What is claimed is:

1. A method for categorizing a transfer target destination associated with a quick response ("QR") code using a plurality of recommendations and an artificial intelligence ("AI") engine, the method comprising:
receiving, at the AI engine, the plurality of recommendations for categorizing the transfer target destination associated with the QR code;
passing each recommendation through a natural language processing ("NLP") algorithm located within the AI engine to correct for spelling errors and to place each recommendation into a common language;
parsing each recommendation passed through the AI engine to extract tag words;
mapping, by the AI engine, each tag word with a respective category;
associating with each respective recommendation the respective category to which a majority of the tag words parsed in the respective recommendation were mapped;
storing, in a database located within the AI engine, each recommendation and associated category;
counting the number of recommendations associated with each category; and
assigning to the transfer target destination associated with the QR code a category with the largest number of associated recommendations;
wherein:
at least a portion of the QR code is generated by a vendor associated with the transfer target destination, the portion of the QR code being used by a plurality of users to conduct transactions with the vendor;
the plurality of recommendations are provided by one or more of the plurality of users; and
the transactions are conducted by the plurality of users using a QR code based transfer application on a smart device.

2. The method of claim 1 wherein:
each of the plurality of users are prompted by the QR code based transfer application on their respective smart devices during the transaction to input a first recommendation; and
following the respective user input of the first recommendation, the first recommendation is received at the AI engine as one of the plurality of recommendations.

3. The method of claim 2 wherein the passing each recommendation through the NLP is performed upon receiving a first threshold number of recommendations.

4. The method of claim 2 wherein the passing, parsing, mapping, associating, storing, counting and assigning are repeated for every new recommendation received by the AI engine.

5. The method of claim 4 wherein the repeating is performed upon receiving a second threshold number of new recommendations.

6. The method of claim 1 wherein when the QR code is assigned a category, during subsequent transactions conducted using the QR code based transfer application the plurality of users are prompted to:
select the category with the largest number of associated recommendations stored in the database;
select the category with the second largest number of associated recommendations stored in the database; or
input a new recommendation.

7. The method of claim 6 further comprising:
upon receipt of the user's selection of the category with the largest number of associated recommendations, adding a recommendation associated with the selected category to the database;
upon receipt of the user's selection of the category with the second largest number of associated recommendations adds a recommendation associated with the selected category to the database; and upon receipt of the user inputting the new recommendation sends the new recommendation to be received at the AI engine.

8. The method of claim 7 wherein the receiving, passing, parsing, mapping, associating, storing, counting and assigning are repeated upon conclusion of each subsequent transaction.

9. The method of claim 8 wherein the prompt is updated to reflect the current category with the largest number of associated recommendations and category with the second largest number of associated recommendations.

10. A method for generating an expense breakdown for a month for a user account having a plurality of transactions conducted at a plurality of vendors including at least one transaction conducted through a QR code based transfer application on a smart device, the method comprising:
  associating the amount of each transaction conducted using a user account number associated with the user account with a category previously assigned to the respective vendor with which the respective transaction was conducted;
  assigning each previously uncategorized transfer target destination associated with a QR code used in one of the plurality of transactions during the month one of the respective categories comprising:
    receiving, at an AI engine, a plurality of recommendations for categorizing the transfer target destination associated with the respective QR code;
    passing each recommendation through a natural language processing ("NLP") algorithm located in the AI engine to correct for spelling errors and to place each recommendation into a single language;
    parsing each recommendation passed through the AI engine to extract tag words;
    mapping, by the AI engine, each tag word with a respective category;
    associating each respective recommendation the respective category to which the majority of the tag words parsed in the respective recommendation were mapped;
    storing, in a database located within the AI engine, each recommendation and associated category;
    counting the number of recommendations associated with each category; and
    assigning to the previously uncategorized transfer target destination associated with the QR code the category with the largest number of associated recommendations;
  associating the amount of each transaction conducted using the previously uncategorized transfer target destination associated with the QR code with the assigned category;
  storing the amount of each transaction and associated category in the database; and
  generating the expense breakdown using a cumulative amount associated with each category stored in the database;
wherein:
  at least a portion of each QR code is generated by one of the respective vendors, the portion being used by a plurality of users to conduct transactions with the respective vendor;
  the plurality of recommendations are provided by one or more of the plurality of users; and
  the transactions conducted using each QR code are conducted by the user associated with the user account using the QR code based transfer application on the user associated with the user account's smart device.

11. The method of claim 10 wherein the expense breakdown is in the form of a pie chart.

12. The method of claim 11 wherein the expense breakdown is in the form of a percentage distribution.

13. The method of claim 10 wherein prior to the transaction conducted through the QR code based transfer application the user account is verified on the QR code based transfer application.

14. The method of claim 13 wherein the user account is verified through confirmation by the user's smart device.

15. The method of claim 13 wherein the user account is verified through a login into the QR code based transfer application.

16. A method for categorizing a transfer target destination associated with a quick response ("QR") code using a plurality of recommendations and an artificial intelligence ("AI") engine, the method comprising:
  receiving, at the AI engine, the plurality of recommendations for categorizing the transfer target destination associated with the QR code;
  passing each recommendation through a natural language processing ("NLP") algorithm located within the AI engine to correct for spelling errors and to place each recommendation into a single language;
  parsing each recommendation passed through the AI engine to extract tag words;
  mapping, by the AI engine, each tag word with a respective category;
  storing, in a database located within the AI engine, each instance of each tag word and each category to which each tag word is associated;
  counting the number of instances of each tag word associated with each category;
  calculating a percentage of each category based on the number of instances associated with each category with respect to a predetermined set of categories and a total number of instances of all the tag words;
  deriving from the calculating a series of categories and percentages associated therewith; and
  enabling a user to select one of the series of categories and percentages associated therewith for assignment to the transfer target destination associated with the QR code;
wherein:
  at least a portion of the QR code is generated by a vendor associated with the transfer target destination, the portion of the QR code being used by a plurality of users to conduct transactions with the vendor;
  the plurality of recommendations are provided by one or more of the plurality of users; and
  the transactions are conducted by the plurality of users using a QR code based transfer application on a smart device.

17. The method of claim 16 wherein the transfer target destination associated with the QR code is assigned respective categories having a percentage greater than 10 percent.

18. The method of claim 16 wherein the transfer target destination associated with the QR code has not been previously categorized.

19. The method of claim 16 wherein the transfer target destination is associated with multiple QR codes.

20. The method of claim 19 wherein the assignment of the percentages and associated categories is conducted upon the total number of instances exceeding a threshold number.

* * * * *